UNITED STATES PATENT OFFICE.

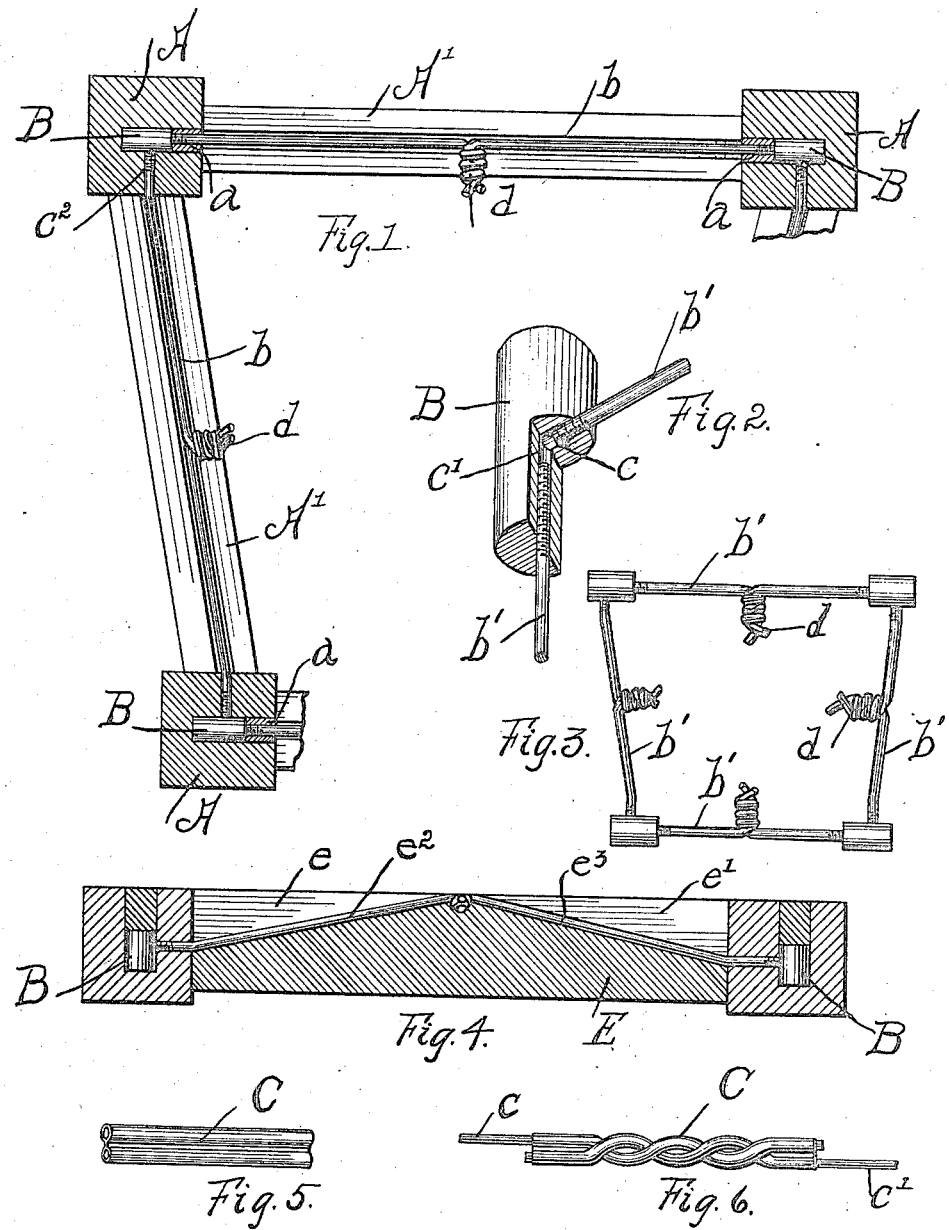

ARTHUR B. RUSSELL, OF CHICAGO, ILLINOIS.

JOINT CONNECTION.

1,239,043.     Specification of Letters Patent.     Patented Sept. 4, 1917.

Application filed June 12, 1916. Serial No. 103,053.

*To all whom it may concern:*

Be it known that I, ARTHUR B. RUSSELL, a citizen of the United States, residing at Chicago, Cook county, State of Illinois, have invented certain new and useful Improvements in Joint Connections, of which the following, taken in connection with the drawings, is a description.

My invention relates to improvements in joint connections and means for bracing and locking together the upright and lateral members in the construction of furniture, such as chairs, tables, davenports, etc., as well as to be used in other constructions in joinery, carpentry, etc.

A further object of my invention is to provide a brace of the class described, adapted to be applied to uprights having lateral members extending at other than a right angle thereto, so as to permit of a greater variety of design and construction than has been possible with furniture as heretofore built.

A further object of my invention is to provide a brace and locking means which may be positioned and arranged within the upright and lateral members so that there is no opening or other mark visible from the outside of the upright member, as has been the case with constructions of this kind as heretofore assembled.

With these and other objects in view, the invention consists in the construction and novel combination and arrangement of parts hereinafter described, illustrated in the accompanying drawings, and pointed out in the claims, it being understood that various changes in the form, proportion, and minor details within the scope of the claims may be resorted to without departing from the spirit of or sacrificing any of the advantages of the invention.

In the drawings—

Figure 1 is a sectional view, partially broken away, of a chair support, with my braces and locking device applied thereto;

Fig. 2 is a detail view of one of the coupling members, with a corner cut out to show the disposition of the brace rods in said member;

Fig. 3 is a plan view of the assembled braces and coupling members;

Fig. 4 is a form of construction uniting two upright members;

Fig. 5 is a detail of a sleeve or fastening device for the rods; and

Fig. 6 is a detail of the same sleeve with the rods therein secured by being twisted together.

Referring to the drawings, A, A, represent the uprights, in this instance of a chair, which is provided with my device. A', A' are two of the lateral members which extend from one upright to the other in the usual manner. Each of the uprights is provided with a socket or recess $a$, which extends transversely of the upright and is of a size suitable to receive the coupling member B. One of the lateral members or rungs A' abuts the upright member opposite the recess $a$, and conceals the recess opening therein, which receives the coupling member.

Each of the rungs or laterally-extending members A' is preferably provided with a longitudinally-extending groove $b$, within which are the brace rods $b'$, extending to the coupling members B which are seated in recesses in the upright members A. Each of these coupling members is provided with two screw-threaded sockets $c$, $c'$, which extend at right angles to each other and receive the screw-threaded ends of the brace rods on two different sides of the upright.

Each of the upright members is provided with a bore $c^2$ extending transversely thereof and at right angles to the socket receiving the coupling member, through which is extended the corresponding brace rod which engages the transversely-extending socket in the coupling member, thereby securely holding said brace rod and at the same time preventing the withdrawal of the coupling member from the socket in the direction of its insertion.

When the rods are secured to the coupling members, preferably by means of a screw-threaded engagement as shown, the opposite ends thereof are secured together approximately mediate the length of the lateral members by twisting the ends of the rods $b'$ together, as at $d$, which securely fastens them and draws them taut from one upright to the other. If adjustment is needed at any time, the rods $b$ may be tightened by twisting them close together.

Where it is desired to secure two uprights together, as shown in Fig. 4, the coupling members are inserted in the recesses in the same manner as heretofore explained. The lateral member E is provided with two grooves $e$, $e'$, which are arranged upon an incline from the center of said member to the opening in the upright member receiving the brace rods $e^2$, $e^3$, which are screw-threaded and engage with the coupling member B. The end of the rods $e^2$, $e^3$, are drawn together and secured as heretofore described.

C (Fig. 5) is a modified form of fastening device for the ends of the rods. In this construction I use a double sleeve which receives the free ends of the rods $c$, $c'$ extending therethrough in opposite directions. By means of a suitable tool, the sleeve with the ends of the wires may be twisted together, as shown in Fig. 6, and securely locked against withdrawal or any possible turning at the opposite end of the coupling member.

It will be observed that by providing a fastening means for rods approximately mediate the length of the lateral members, either as shown in Fig. 3 or Fig. 4, a bearing surface is provided against the lateral member which prevents any reverse movement or any possibility of the parts becoming loosened, either at the point where the rods are joined together, or where the rods engage the coupling members.

In case of any shrinkage in the wood out of which the joints are formed it may be necessary to tighten the rods, it may be easily and quickly done by a further turning of the fastening means and drawing the ends of the wires together.

I claim:

1. A joint construction comprising upright and lateral members, some of said lateral members meeting uprights at different angles, coupling members invisibly seated within the upright members, tie rods formed in sections and having one end of each rod engaged in a coupling member, said rods lying parallel with its corresponding lateral member, the meeting ends of the rods extending parallel with any lateral member being connected together to resist strains, substantially as described.

2. A joint construction comprising upright and lateral members, some of said lateral members meeting uprights at different angles, coupling members invisibly seated within the upright members, tie rods formed in sections and having one end of each rod engaged in a coupling member, said rods lying parallel with its corresponding lateral member, the meeting ends of the rods extending parallel with any lateral member, being adjustably connected together to resist strains, substantially as described.

3. A joint construction comprising upright and lateral members, some of said lateral members meeting successive uprights at different angles, coupling members invisibly seated within the upright members, tie rods made in separate sections and having one end of each rod engaged in a coupling member, said rods being bent to lie parallel to the lateral members, the meeting ends of the rods being connected together to resist longitudinal strain as a unit and their sections may not rotate axially independently of each other.

4. A joint construction comprising upright and lateral members, some of said lateral members meeting successive uprights at different angles, coupling members invisibly seated within the upright members, tie rods made in separate sections and having one end of each rod engaged in a coupling member, said rods being bent to lie parallel to the lateral members, the meeting ends of the rods being adjustably secured together at any desired tension and locked against any reverse movement.

In testimony whereof I have hereunto signed this specification.

ARTHUR B. RUSSELL.